(12) United States Patent
Bortnikov et al.

(10) Patent No.: US 6,631,518 B1
(45) Date of Patent: Oct. 7, 2003

(54) GENERATING AND UTILIZING ORGANIZED PROFILE INFORMATION

(75) Inventors: Vita Bortnikov, Haifa (IL); David John Lambert, Rochester, MN (US); Bilha Mendelson, Haifa (IL); Robert Ralph Roediger, Rochester, MN (US); William Jon Schmidt, Rochester, MN (US); Inbal Shavit-Lottem, Kibbutz Bet-Oren (IL)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 08/820,736

(22) Filed: Mar. 19, 1997

(51) Int. Cl.[7] .................................................. G06F 9/45
(52) U.S. Cl. ..................................................... 717/158
(58) Field of Search ................................. 395/704, 705, 395/706, 707, 708, 709, 183.11, 183.14; 714/35, 38; 717/158

(56) References Cited

U.S. PATENT DOCUMENTS

| | | | | |
|---|---|---|---|---|
| 5,313,616 A | * | 5/1994 | Cline et al. | 395/704 |
| 5,428,793 A | * | 6/1995 | Odnert et al. | 395/709 |
| 5,613,118 A | * | 3/1997 | Heisch et al. | 395/709 |
| 5,655,122 A | * | 8/1997 | Wu | 395/705 |
| 5,689,712 A | * | 11/1997 | Heisch | 395/704 |
| 5,732,272 A | * | 3/1998 | Gochee | 395/704 |
| 5,768,592 A | * | 6/1998 | Chang | 395/704 |
| 5,828,883 A | * | 10/1998 | Hall | 395/704 |
| 5,835,701 A | * | 11/1998 | Hastings | 395/183.11 |
| 5,838,976 A | * | 11/1998 | Summers | 395/704 |

OTHER PUBLICATIONS

Compiler Transformations for High–Performance Computing, Bacon et al, ACM Computing vol. 26, No. 4, Dec. 1994.*

Turbo Profiler 2.0 Borland Corporation User's Guide whole manual, 1991.*

Compilers Principles, Techniques and Tools Aho et al Chapters 1 and 10, Sep. 1985.*

Visual C+ + Professional Tools User's Source Profiler User's Guide whole manual version 1, 1993.*

Graham et al., "An Execution Profiler for Modular Programs", Software Practice and Experiencevol. 13, 1983, pp 671–685.*

Wall, "Predicting Program Behavior Using Real or Estimated Profiles", Proceedings of the ACM SIGPLAN '91 Conference on Programming Language Design and Implementation, Jun., 1991, pp 59–70.*

Chang et al., "Profile–guided Automatic Inline Expansion for C Programs", Software Practice and aexperience, vol. 22(5), May 1992, pp 349–369.*

Chang et al., "Using Profile Information to Assist Classic Code Optimizations", Software Practice and Experience, vol. 21(12), Dec. 1991, pp 1301–1321.*

Ball et al., "Optimally Profiling and Tracing Programs", ACM Transactions on Programming Languages and Systems, vol. 16, No. 4, Jul. 1994, pp 1319–1360.*

Cox et al., "Commercializing Profile–Driven Optimiztion", Proceedings of the 28th Annual Hawaii International Conference on System Sciences, 1995, pp 221–228.*

* cited by examiner

Primary Examiner—T. D. Ingberg
(74) Attorney, Agent, or Firm—Schmeiser, Olsen & Watts; Steven W. Roth (57) ABSTRACT

Disclosed is a system and method for a profiling system wherein profile data is stored in a separable hierarchical fashion such that profile data for each compiled procedure in a computer program can be readily identified and utilized. In particular, each source module has a corresponding profile data file and each procedure has a corresponding procedure profile area. The system and method also includes a mechanism for verifying the existence and validity of profile information, and a mechanism for handling invalid profile information.

29 Claims, 8 Drawing Sheets

GENERATING AND UTILIZING ORGANIZED PROFILE INFORMATION

FIELD OF THE INVENTION

The present invention relates to the optimization of computer program instructions. More particularly, the present invention relates to a compiler program that utilizes a profiling optimization system.

BACKGROUND OF THE INVENTION

The development of the EDVAC computer system of 1948 is often cited as the beginning of the computer era. Since that time, dramatic advances in both hardware (i.e., the computer's electronic components) and software (i.e., computer programs) have drastically improved the performance of computer systems. However, modem software programs, often containing millions of instructions, have become very complex when compared with early computer programs. Because the execution time (and hence, performance) of a computer program is very closely related to the number of instructions contained in the program, developers must continue to find new ways of improving the efficiency of computer software.

Most modem computer programs are typically written in a high-level language that is easy to understand by a human programmer. Special software tools, known as compilers, take the human-readable form of a computer program, known as "source code," and convert it into machine-readable instructions, known as "object code." Because a compiler generates the stream of instructions that are eventually executed on a computer system, the manner in which the compiler converts the source code into object code affects the execution time of the computer program.

As noted, the continual desire to use larger, faster and more complex software programs has forced system developers to find new methods of improving the rate at which programs run. Software developers have focused a great deal of effort on developing methods of generating efficient computer instructions that can take full advantage of the hardware systems on which they are to be executed. Such methods of improving the sequencing or placement of computer instructions within a computer program are referred to as optimizations. Numerous optimization techniques to improve the performance of software are known in the art today.

Profiling is one technique that can be used to improve software optimization. Profiling uses predicted information on how a program will run to further optimize the computer program. For example, if it is known that certain blocks of code (i.e., distinct portions of a program) will be executed more often than other code blocks, performance may be enhanced by handling those blocks of code in a particular manner. (E.g., it might be desirable to position the code blocks in memory in a manner that improves the utilization of cache memory.) Thus, profiling seeks to improve optimizations and therefore system performance by using information regarding the expected behavior of blocks of code within a computer program. Specifically, by identifying frequently used code blocks and execution paths, software programs can be created to maximize the performance of the hardware on which they will run.

In order to implement any profiling system, accurate profile or behavior information must be collected by first running the program on a set of inputs believed to represent typical operating conditions. Collecting profile information is referred to as "benchmarking." Once the profile information is collected, it can then be used for optimization purposes during a subsequent compilation of the source code used to build the program. Various known methods of optimizing program code with profile data exist.

While most profiling mechanisms are fairly automated (e.g., compilers often include automated mechanisms for facilitating profiling), the actual process of profiling a software program can become fairly time consuming and costly as the size and complexity of the program grows. One recognized limitation with profiling is that as software errors (i.e., bugs) are identified and corrected, the entire profiling of the program must often be repeated. Under typical conditions, it would be inappropriate to use old profiling data with a modified software program because the execution paths traversed in the modified code may differ significantly from the execution paths traversed in the original code for which the profile data was gathered. Furthermore, if new procedures are added, additional instrumentation code may be required to properly profile the program. Thus, with respect to profiling, a potentially significant amount of overhead is created each time a software program is modified.

This problem may not be that serious as long as the software program is relatively small. However, with larger programs, such as operating systems that may contain thousands of source code modules and millions of lines of source code, the time and expense involved in re-profiling the program each time a minor bug fix occurs may be significant. Moreover, delivering a bug fix (i.e., a patch) to the customer may then require shipping an entire new product, which creates additional overhead and expense to both the developer and the customer. At present, no other viable option exists (which does not result in serious performance degradation) except to reprofile the entire program after each source code modification.

Thus, because of the economic drawbacks involved, present profiling methodologies cannot be effectively used with complex commercial software products, such as operating systems. Without a profiling system and method that can support bug-fixing without significantly sacrificing system performance, the use of profiling in large systems will be limited.

SUMMARY OF THE INVENTION

The present invention provides a system and method that organizes profile information in a hierarchical fashion in order to eliminate the need to re-profile a program each time a software error is fixed. The apparatus and method disclosed herein causes profile information to be stored in procedure specific storage areas during the benchmarking phase and then, during the optimization phase, provides a system for identifying and utilizing valid profile information (and ignoring invalid profile information) as each procedure is processed.

The invention features a compiler system that includes a code generator for converting a first instruction module into a second instruction module; an instrumentation mechanism for inserting instrumentation code into the second instruction module and for initializing procedure specific data storage areas for each procedure within the first instruction module being compiled; and an optimization mechanism that optimizes using any available valid procedure specific profile data. The invention may further comprise a harvesting mechanism that can organize procedure specific profile information into files readable by the above-described optimization mechanism.

The invention further features a method of generating and utilizing profile data for a computer program that is built from at least one source code module wherein the method comprises the steps of: creating an instrumented executable program that includes a process for generating procedure specific profile data; benchmarking the instrumented executable program and storing profile information in procedure specific data areas; and optimizing the source code module such that the procedures that have not been modified since the benchmarking step will be processed using said procedure specific profile data while the procedures that have been modified since the benchmarking step will be processed without procedure specific profile data.

The invention also features a system and method for reordering procedures within an object module or executable module that uses procedure specific profile data. In particular, the system and method provide an improved system for determining the order of procedures even in the case where significant source code changes, such as the addition or deletion of entire procedures, took place.

Therefore, it is an advantage of the present invention to provide a profiling system that will permit bug fixes and program improvements to occur without serious loss of performance and without rebuilding or rebenchmarking an entire software product. It is therefore a further advantage of the present invention to provide a profiling system in which profile data is stored in a hierarchical and separable fashion. It is therefore a further advantage of the present invention to have a separate unique profile data file for each source code module that is used to build a software product. It is therefore a further advantage of the present invention to have a unique area for holding profile data for each procedure of a source code module. It is a further advantage of the present invention to provide an optimization system in which module counter areas and procedure counter areas can be checked for their existence and validity.

BRIEF DESCRIPTION OF THE DRAWINGS

The preferred embodiments of the present invention will hereinafter be described in conjunction with the appended drawings, where like designations denote like elements, and.

DESCRIPTION OF THE PREFERRED EMBODIMENT

The present invention relates to the optimization of computer programs using profile data. For those that are not experts in the field, the Overview section below provides general background information that will be helpful in understanding the concepts of the invention.

Overview

1. Profiling

Many modem software development environments include a profiling mechanism that uses information collected about a program's runtime behavior (known as profile data) to improve optimization of that program. "Profile data" as used herein means any estimates of execution frequencies in a computer program, regardless of how the estimates are generated.

There are various profiling systems, or mechanisms for generating profile data. Examples include instrumenting profilers, trace-based profilers, and sampling profilers. Instrumenting profilers operate by recompiling the program with special instrumentation "hooks" placed at important branch points. As the instrumented program executes, these hooks cause data counters to be updated, accumulating the branch decisions. Trace-based profilers operate by collecting an execution trace of the instructions executed by the program. Information is then reduced to a manageable size to determine how often each branch in the program was taken and not taken. A sampling profiler operates using a hardware timer, periodically waking up a process that records the address of the currently executing instruction. While the present invention is generally concerned with improvements in instrumenting profilers, it is recognized that any other type of profiling system could be covered by certain aspects of this invention.

As noted above (with regard to instrumenting profilers), the program must first be retrofitted with instrumentation code (i.e., hooks) that causes profile information to be saved when the program is executed on a representative set of inputs. Instrumentation code typically involves strategically inserted instructions that count how often a block of code is executed or how often a certain path is taken (i.e., how often block A transfers control to block B). Once the profile information is collected, it can then be used to optimize the very program from which it was collected. Various methods of optimizing program code with profile data are known in the art. Thus, a typical instrumenting profiling system includes (1) an instrumentation phase where a program is retrofitted with "information collecting" instructions; (2) a benchmarking phase where the program is run and profile information is collected; and (3) an optimization phase where the program is recompiled and optimized in light of the profile information.

2. Compilers

Executable computer programs are typically constructed by software programs called compilers. Initially, a programmer first drafts a computer program in human readable form (called source code) prescribed by the programming language, resulting in a source code instruction stream or module. The programmer then uses mechanisms that change the human readable form of the computer program into a form that can be understood by a computer system (called machine-readable form, or object code). Additional processing, such as linking, may then occur. Linking involves a process where multiple object modules are combined together to create a single executable computer program. The mechanisms described herein are typically called compilers; however, it should be understood that the term "compiler," as used within this specification, generically refers to any mechanism that transforms one representation of a computer program into another representation of that program.

The machine-readable form, within this specification, is a stream of binary instructions (i.e., ones and zeros) that are meaningful to the computer. Compilers generally translate each human readable statement in the source code instruction stream into zero or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine-readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers and assemblers.

Many of today's compilers include mechanisms for performing profiling operations. For example, compilers can automatically insert instrumentation code into the created object modules during the compilation process of an instrumentation phase. Thus, an instrumented computer program can be automatically generated. Compilers can also automatically read in profile information during an optimization phase to create an optimized version of the computer program.

Figure 8:
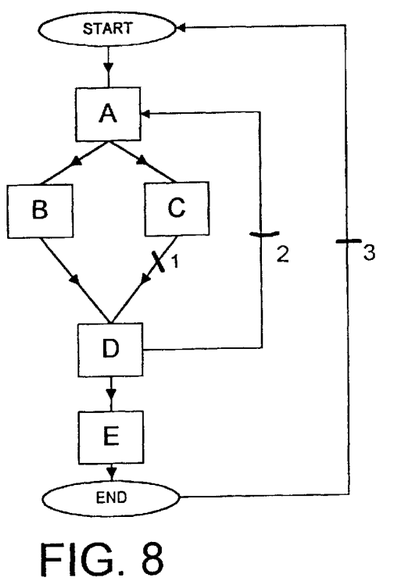
FIG. 8 depicts a control flow graph for a software procedure.

An example of a profiling system and certain limitations associated therewith are discussed with reference to FIGS. 8–11. FIG. 8 depicts a control flow graph (CFG) that represents a procedure having code blocks A, B, C, D and E. The CFG of FIG. 8 includes control paths or "arcs" represented by arrows that depict how control may be transferred between blocks. For example, program control may be transferred from block A to block B or block C. However, control is never directly transferred from block A to block D or block E. Representing procedures in this manner is well known in the art of optimizations.

Another data structure commonly used to represent the behavior of a program is a call graph. A call graph for a module consists of one or more nodes such that there exists a node for each procedure in the module. For example, if a module has three procedures, "main," "foo" and "bar," then the call graph will have three corresponding nodes. In addition to nodes, call graphs contain arcs placed between the nodes if control can be transferred between the nodes. For example, if procedure "main" can transfer control to procedure "foo," an arc is placed from node "main" to node "foo."

By determining which paths are most frequently traversed or which of the code blocks are most frequently executed, a compiler can use known techniques to efficiently optimize the procedure. Such information is provided to the compiler in the form of profiling data. Once the compiler has the profile information, the CFG representing the procedure being processed can be "annotated" (i.e., each arc in the CFG is given a relative weight). Similarly, arcs in call graphs can be annotated with weights indicating the estimated relative frequencies of procedure calls. Moreover, advanced techniques allow a CFG to be fully annotated by knowing the weights of only a subset of the arcs. For example, with respect to FIG. 8, the count information for the entire CFG can be determined by collecting count data for arcs labeled 1, 2 and 3.

Figure 9:
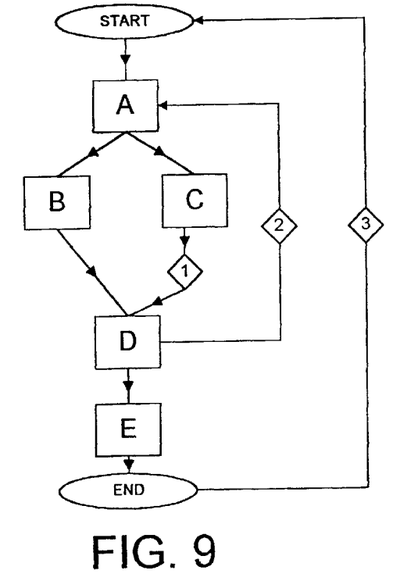
FIG. 9 depicts the control flow graph of FIG. 8 with instrumentation blocks added.

FIG. 9 depicts a modified CFG in which instrumentation code has been inserted along arcs 1, 2 and 3. The instrumentation code will typically include access to control flow counters that will be incremented each time one of these arcs or paths is traversed during program execution. Once the procedure as shown in FIG. 9 has been executed on a representative set of inputs, profile information from the counters can be extracted and later inputted to the optimizer during a subsequent compilation.

Figure 10:
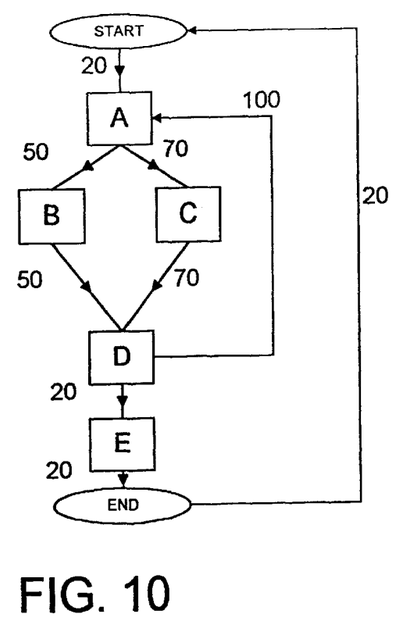
FIG. 10 depicts the control flow graph of FIG. 8 with fully annotated arcs.

FIG. 10 depicts a fully annotated CFG used during such a profile feedback step. Here, it can be seen that each arc has a weight associated therewith. (E.g., the arc from block A to block B has a relative weight of 50.) By knowing such weights, the compiler can make optimization decisions such as: how to order these blocks in memory; when to allow early speculative execution of instructions; when it may be profitable to unroll the body of a loop; where to place register spill code to minimize the cost of spill; and many others.

Figure 11:
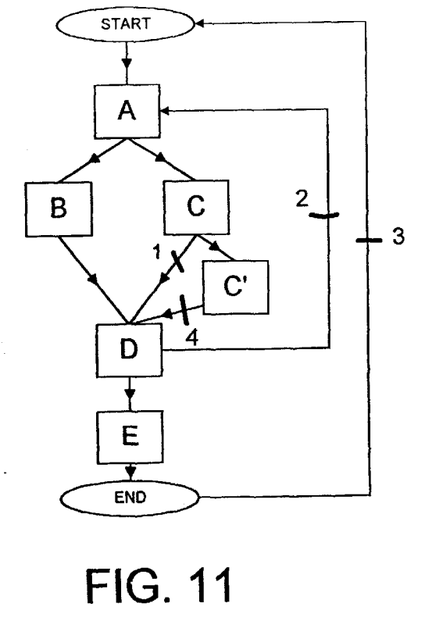
FIG. 11 depicts a control flow graph for a revised program procedure.

FIG. 11 depicts the procedure of FIG. 8 with a slight modification, that is, the addition of a new code block C'. While this modification appears to be fairly minor, an additional arc must be instrumented in order to provide accurate profile information for this procedure. In this case, arcs 1, 2, 3 and 4 must now include instrumentation code in order to provide a fully annotated CFG. In other words, an additional counter must be instrumented in order to accurately represent the behavior of this procedure.

It can therefore be seen that any time a modification is made to a procedure that causes a change to its control flow graph, the profile information previously gathered for the procedure will often be at least partially invalid or incomplete. Prior profiling systems are unable to use existing profile data in such cases, and must generate new profile data for the whole program each time a procedure is modified, if the benefits of profile-based optimizations are to be maintained.

The present invention seeks to provide a hierarchical management of profile data such that for systems that have many procedures and source code modules, existing profile information can still be used even if source code modifications took place. This is achieved by storing the profile information in such a way that the feedback optimization step can identify invalid profile information and skip only the profiling data of those procedures. Conversely, all those procedures that had no modifications will continue to use the existing profile information. The result is a system that can use existing profile information while only experiencing a small amount of performance degradation.

Further, the present invention can sometimes use existing profile data for a procedure even when that procedure has been modified. Referring again to FIG. 11, it can be seen that the weights of all the arcs except C–D, C–C', and C'–D can be accurately determined from the original profile data, provided that the correspondence between the arcs in the original CFG and the arcs in the modified CFG can be determined. In such cases, the compiler can estimate the weights of the arcs that cannot be reconstructed. For example, since block C is known to be executing 70 times, the compiler might assign weights of 35 to each of arcs C–D, C–C' and C'–D in FIG. 11. For the purposes of discussing the present invention, profile data will be said to be "valid" either if the corresponding procedure has not changed, or if the data is considered sufficiently adequate (e.g., it is similar enough to the original procedure) and the compiler can still use the data in this fashion.

Detailed Description

Figure 1:
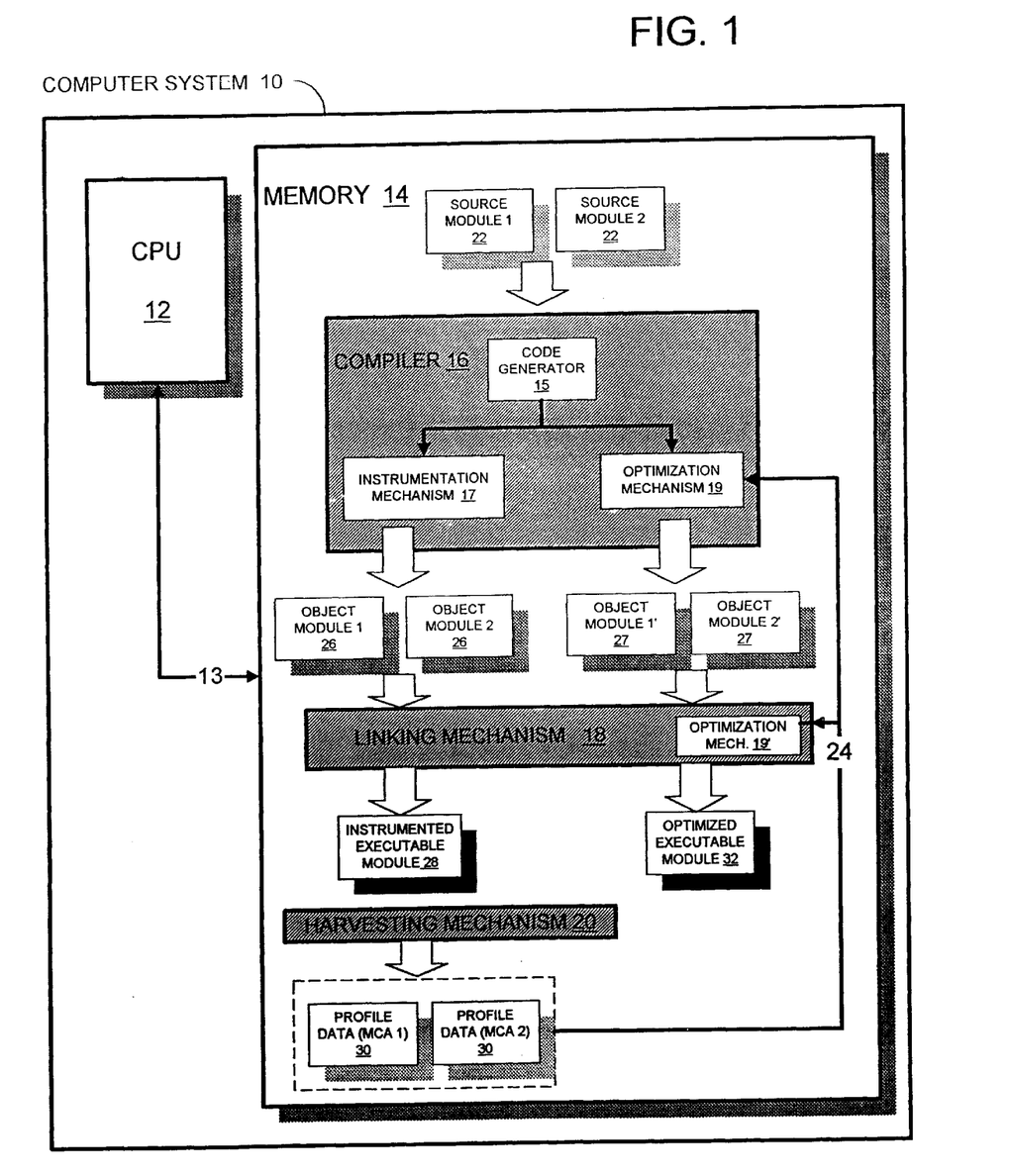
FIG. 1 depicts a block diagram of a computer system that includes a compiler mechanism in accordance with a preferred embodiment of the present invention.

Referring now to FIG. 1, a computer system 10 is shown that includes a central processing unit (CPU) 12, memory 14 and a bus 13. Those skilled in the art will appreciate that the mechanisms and apparatus of the present invention apply equally to any computer system, regardless of whether the computer system is a complex multi-user computing apparatus, a single user workstation, a personal computer, or an apparatus (e.g., a television, an automobile, etc.) having a computer device embedded therein. In addition, it should be recognized that other computer system components such as cache, input/output (10) devices and network interfaces, while not shown, may be included in computer system 10. Additionally, although computer system 10 is shown to contain only a single CPU 12, it should be understood that the present invention applies equally to computer systems that have multiple CPU's.

Pursuant to this invention, memory 14 is shown containing a compiler 16 that is capable of receiving source modules 22 and subsequently outputting at least two types of object modules 26 or 27 that can be linked by linking mechanism 18 to create at least two types of executable program modules 28 and 32. In addition, harvesting mechanism 20 can be used to store profile data 30 in a manner acceptable to the compiler. Profile data 30, once collected, can be fed back into compiler 16 or linking mechanism 18 via path 24. It is understood that compiler 16, linker 18, harvesting mechanism 20, and any files generated therefrom, in addition to residing in memory 14, may exist in the form of a program product that resides on any type of storage media such as magnetic disc, magnetic tape, CD-ROM and other optical media, transmission media, etc.

Main memory 14 may also contain an operating system and other application programs (not shown). Moreover, the programs depicted in memory 14 need not always be completely stored in main memory 14. Rather, slower mass storage devices may be utilized to hold programs and/or other files while they are awaiting processing or execution. Furthermore, those skilled in the art will recognize that programs and data need not reside on computer system 10, but could reside on another computer system and engage in cooperative processing through the use of well known client-server mechanisms.

As noted, compiler 16 includes a code generator 15 that can be directed to compile source modules 22 in a first manner that includes a novel instrumentation mechanism 17 or in a second manner that includes a novel profile optimization mechanism 19. The decision to utilize either mechanism may typically be implemented during the compilation procedure with the use of a command line switch. The output of compiler 16, under either case will be an object module for each source module 22 compiled. In the case where the instrumentation mechanism 17 is used, object modules 26 will be generated. In the case where the profiling optimization mechanism 19 is used, object modules 27 will be generated. It should be recognized that while this embodiment assumes a one-to-one correspondence between source modules and object modules, this invention also covers those compilers that generate multiple object files from a single source file or those compilers that generate a single object module from multiple source files.

The instrumentation mechanism 17 will typically be utilized when the developer seeks to generate profile information that can later be fed back to the compiler 16 to optimize the program. When the instrumentation mechanism 17 is implemented, source code modules 22 are compiled to create object modules 26 which in turn will be linked together by linking mechanism 18 to create an instrumented executable module 28. It should be recognized by those skilled in the art that additional procedures and mechanisms may be required to complete compilation (e.g., preprocessing, the linking of libraries with object modules, etc.). In addition, it is recognized that linking mechanism 18 may be incorporated directly into compiler 16, and need not be a separate mechanism. Once the instrumented executable module 28 is created, it can be run on a representative set of inputs.

The instrumentation mechanism 17 includes a mechanism for inserting instrumentation code into the program to provide profile information for procedures contained in each source module. In addition, it includes a mechanism to set up unique and novel storage areas for collecting profile information. These storage areas, referred to herein as module counter areas (MCA's) and procedure counter areas (PCA's) are described in more detail with regard to FIGS. 2 and 3. The initialization of these storage areas allows profile information to be stored and managed in module-specific and procedure-specific areas, which can later be easily examined and retrieved.

Once the instrumented executable module 28 is executed with representative inputs, profile data 30 can be collected for later use. In this preferred embodiment, a harvesting mechanism 20 is utilized to convert the collected profile data into profile data files 30. Each profile data file 30 has a one-to-one correspondence with a source module 22. Thus, source module I will have its own profile data file (MCA 1), and source module 2 will have its own profile data file (MCA 2). Any additional source modules will likewise have their own unique profile data files. Each profile data file includes one or more procedure counter areas. Each procedure counter area within a profile data file corresponds to a procedure from the corresponding source module. Therefore, if source module I had three procedures "main," "foo" and "bar," its corresponding profile data file will have three procedure counter areas identified as "main," "foo" and "bar." The profile data files may be stored or archived with their corresponding source modules for later retrieval.

The second feature of interest of compiler 16 is the profile optimization mechanism 19 that reads in profile data files 30 during the execution of source modules 22 to create object modules 27. The object modules 27 can then be linked together to create an optimized executable module 32. In addition, it is possible for part of the optimization mechanism 19' to reside within the linking mechanism 18 for handling procedure packaging within the optimized executable module 32. The optimization mechanism 19 can identify and locate the appropriate profile data file 30 for the source module 22 currently being compiled. Likewise, for each procedure in the source module being compiled, the profile optimization mechanism 19 will verify the existence and validity of its corresponding PCA. Should the optimization mechanism come across an invalid procedure counter area, the profile input information for that particular procedure will be skipped and that procedure will be compiled without profiling. Thus, in the event that a particular procedure within a particular source module is modified (e.g., for a bug fix etc.), re-profiling of the entire program with all its source modules will not be necessary. Rather, the individual source module 22 can be recompiled using existing profile information from its corresponding profile data file 30. Then, the optimization mechanism 19 will determine whether the profile information for each procedure is valid, and if so, will process the procedure accordingly. For those procedures having invalid or nonexistent profile data, profiling will be skipped.

Thus, this system allows individual source modules 22 to be modified and recompiled into object modules 27 using existing profile data. The recompiled modules can then be linked with the existing object modules 27 using linking mechanism 18. In addition, linking mechanism 18 can use the collection of profile data files to build a weighted call graph in order to determine an optimized procedure packaging order. The systems and methods described herein with regard to FIG. 1 are described in more detail with regard to FIGS. 2–7 and 12.

Figure 2:
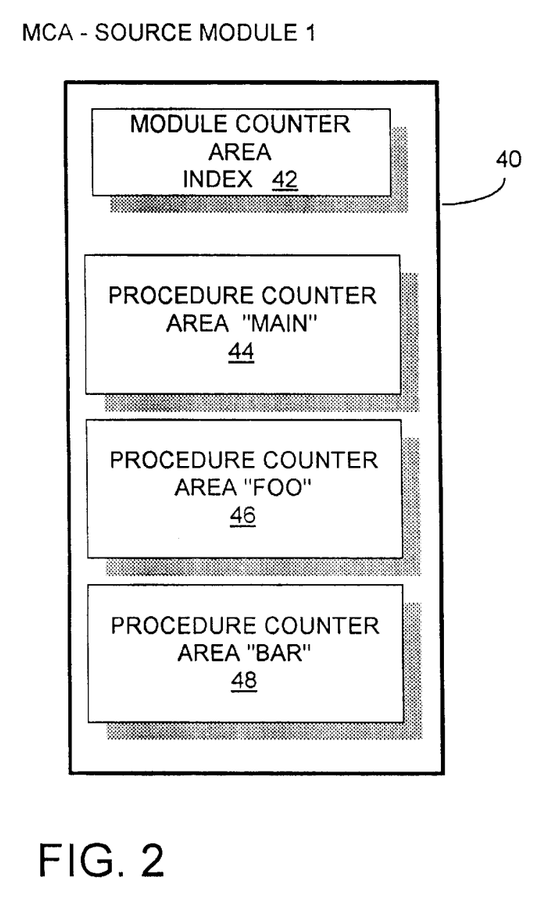
FIG. 2 depicts an example of a module counter area in accordance with a preferred embodiment of the present invention.
Figure 3:
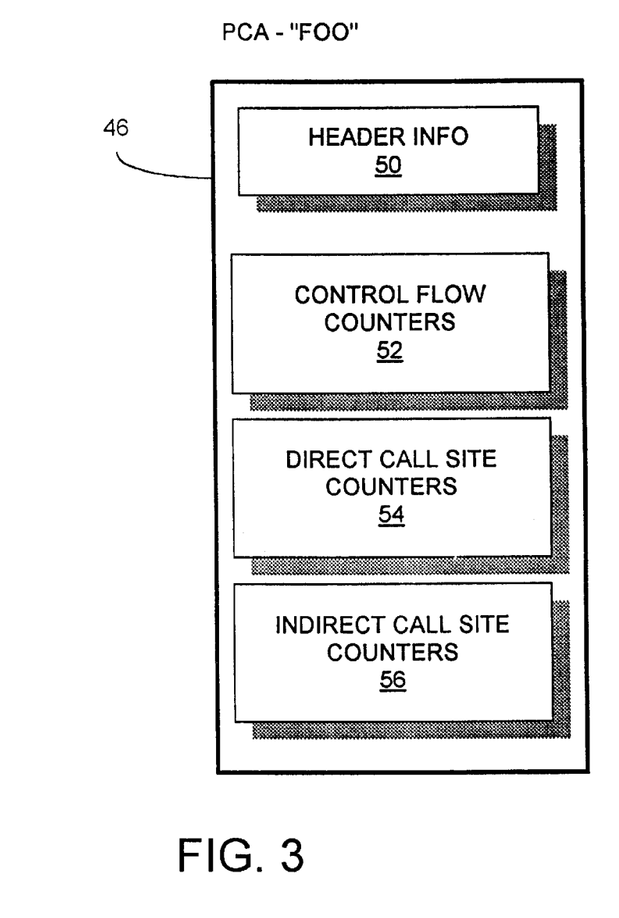
FIG. 3 depicts an example of a procedure counter area in accordance with a preferred embodiment of the present invention.

Referring now to FIG. 2, a module counter area 40 corresponding to source module 1 of FIG. 1 is shown. The module counter area (MCA) 40 includes a module counter area index 42, and one or more procedure counter areas 44, 46 and 48. As noted, each procedure counter area corresponds to a procedure that exists in the corresponding source module. The module counter area index 42 is used by the optimization mechanism 19 to locate a specific procedure counter area. FIG. 3 depicts a procedure counter area 46 of the module counter area shown in FIG. 2. In particular, the PCA "foo" is shown to include header information 50, control flow counters 52, direct call site counters 54 and indirect call site counters 56. Control flow counters 52 are used to measure arcs in a procedure's control flow graph, as shown in FIG. 9. Call site counters are used to measure occurrences of calls to other procedures within a procedure body. (A direct call site counter is used when the procedure to be called is known at compile time, while an indirect call site counter is used when the called procedure's identity is known only during program execution.) The header information 50 provides general information regarding the procedure such as some type of identification, the number and type of each counter, etc. Thus, by including header information 50, a PCA for a given procedure can be found even if procedures are added or deleted from the source code. While the PCA of FIG. 3 is shown to contain counters that are typically known and used for profiling purposes, any type or number of counters may be implemented.

Finally, with regard to FIGS. 2 and 3, it should be recognized that the overall format and storage of these counter areas is not critical. Rather, it is the ability to provide a means by which an optimization mechanism can locate profile information for individual source modules and their procedures. Thus, while this hierarchical system of using MCA's and as a preferred embodiment, it is recognized that other data management and storage facilities could also be used.

Figure 4:
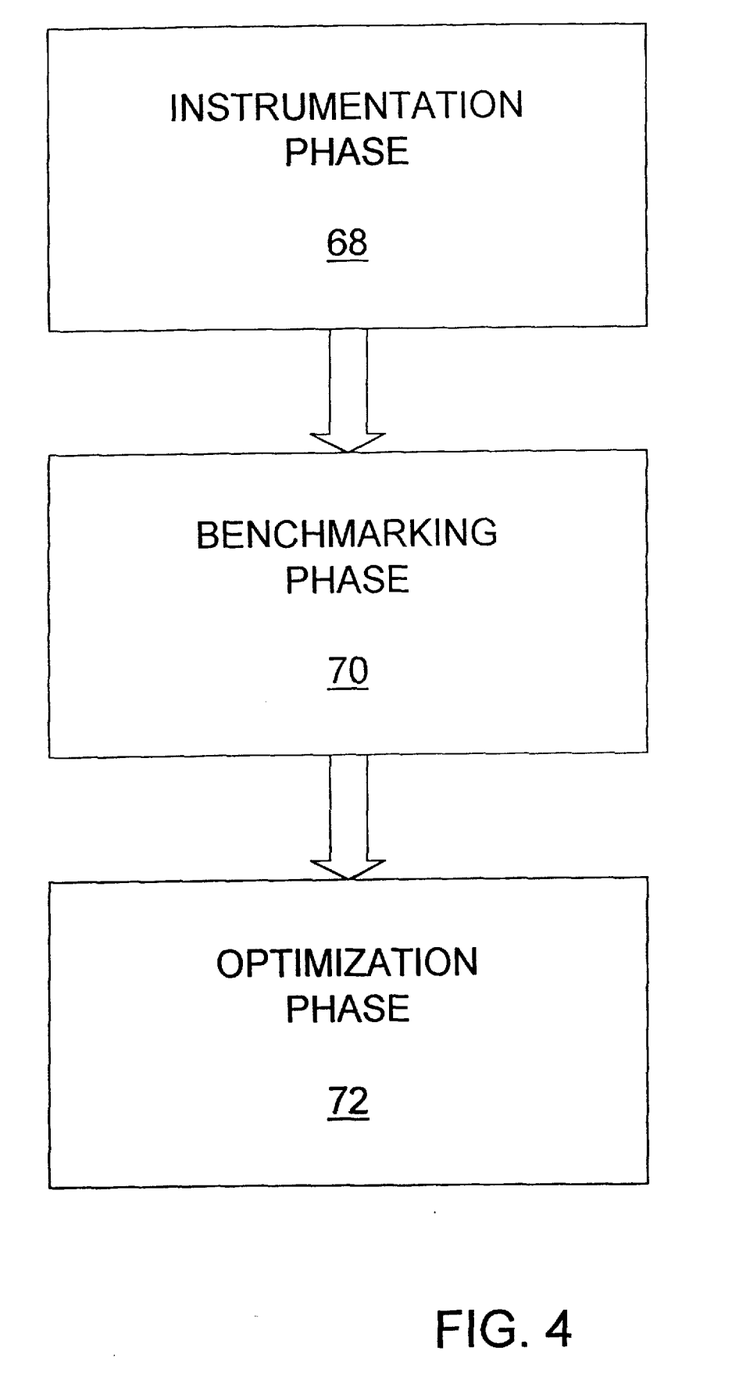
FIG. 4 depicts a flow diagram of the fundamental phases of a profiling system in accordance with a preferred embodiment of the present invention.

Referring now to FIGS. 4–7, various flow charts are shown that describe preferred methods of implementing this invention. FIG. 4 depicts an overview of the three phases involved in the implementation of this invention. The first phase, the instrumentation phase (step 68), involves the process wherein compiler 16 inserts instrumentation code into the module and sets up storage areas for collected profile data. The benchmarking phase (step 70) involves the process wherein the instrumented executable module 28 is executed and profile data 30 is gathered therefrom. The final phase, the optimization phase (step 72), involves the process wherein the compiler 16 receives feedback information in the form of profile data 30 to create an optimized executable module 32.

Figure 5:
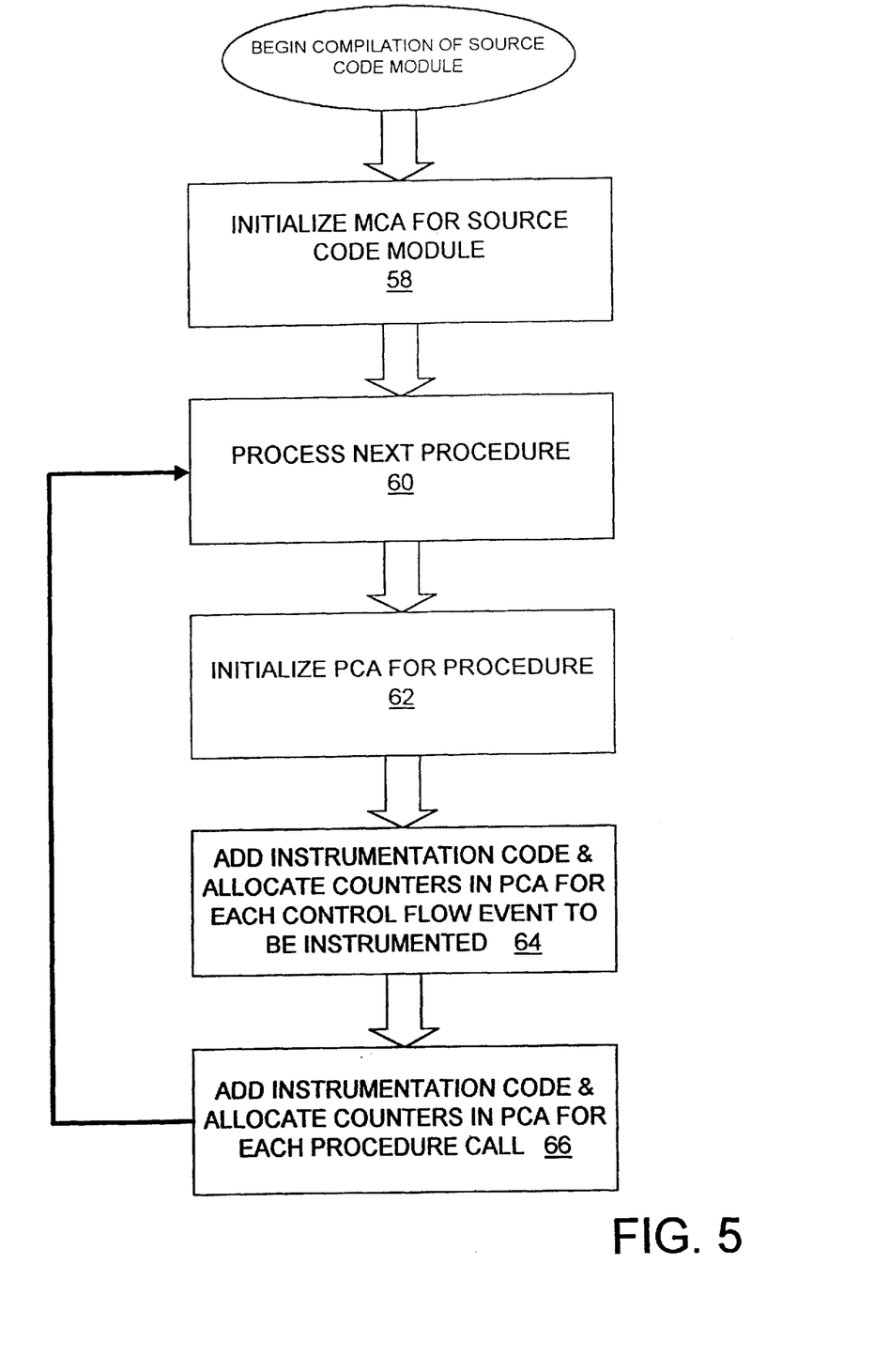
FIG. 5 depicts a flow diagram of the instrumentation phase in accordance with a preferred embodiment of the present invention.

Referring now to FIG. 5, a flow chart is shown describing the instrumentation phase of this invention in greater detail. First, the compilation of an individual source code module 22 is performed by compiler 16, applying instrumentation mechanism 17. For each source code module 22 being compiled, an MCA is initialized (step 58). At this point, the MCA is defined as a static data object (of as yet undetermined size) that is included in the object module 26 generated by the compiler 16.

Next, each procedure within the source module 22 is processed (step 60). Similar to the MCA described above, a PCA is initialized for each procedure and is allocated from within the MCA (step 62). Next, instrumentation code is added at the appropriate places in the module being compiled and counters are allocated in the PCA for each arc that is to be instrumented (step 64). Similarly, instrumentation code is added and counters are allocated within the PCA for each procedure call identified (step 66). These steps are then repeated for each procedure until the module is completely processed. Once the source module is completely compiled, additional source modules may be compiled in a similar fashion and later linked together to create an instrumented executable module 32. It should be understood that the decision to implement different types of counters (e.g., for each arc, for each procedure call, etc.) is not critical to the implementation of this invention. To those skilled in the art, it is understood that other types of profiling information can be gathered. It is further understood that the concept of instrumenting along arcs in this description is used for exemplary purposes only. Instrumentation code may be placed along arcs or within basic blocks, or in any location deemed appropriate.

Figure 6:
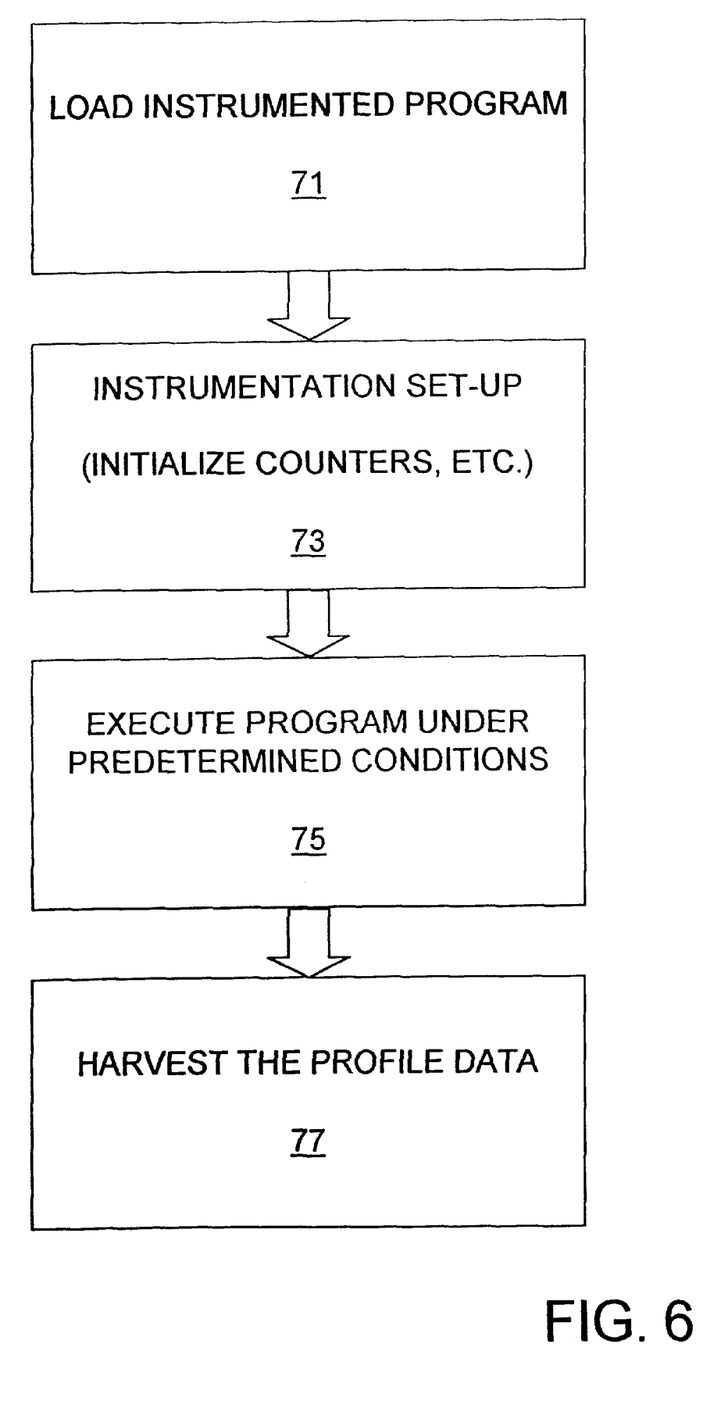
FIG. 6 depicts a flow diagram of the benchmarking phase in accordance with a preferred embodiment of the present invention.

FIG. 6 depicts a flow diagram of the benchmark phase shown in FIG. 4. Pursuant to this embodiment, the instrumented program 28 is loaded (step 71), any instrumentation parameters are set up (e.g., counters are initialized) (step 73), the instrumented program is executed on a set of inputs believed to represent typical usage of the program (step 75), and the profile data is harvested (step 77). The result is a plurality of profile data files 30, each corresponding to a source module 22.

Figure 7:
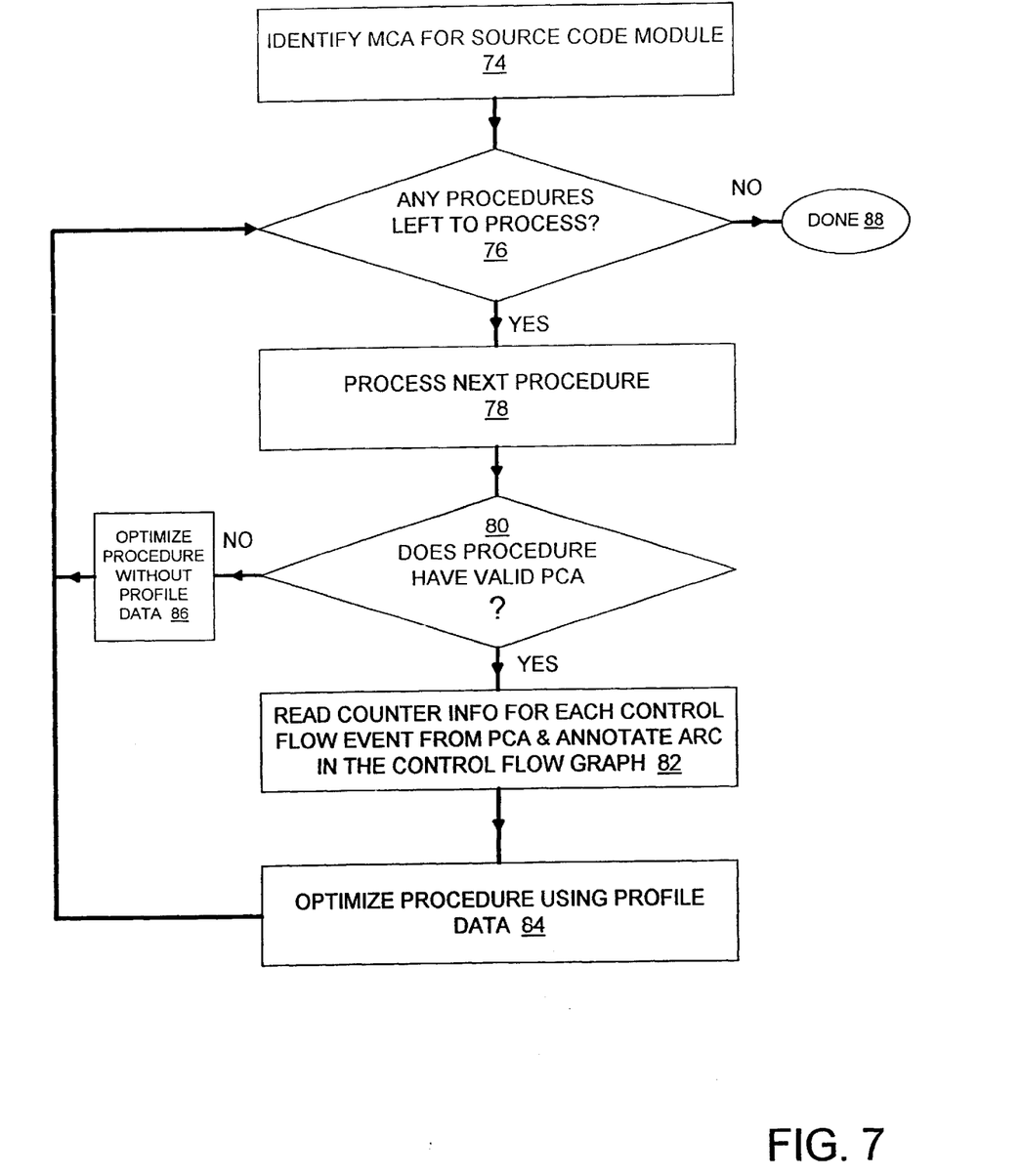
FIG. 7 depicts a flow diagram of the optimization phase within a compiler in accordance with a preferred embodiment of the present invention.

FIG. 7 depicts a detailed flow diagram of the optimization phase of FIG. 4 within compiler 16. Under this invention, one or more source code modules may be involved in the optimization phase 72. For instance, if an optimized executable program 32 has not yet been created, the developer will need to compile all of the source modules 22 with the collected profile data. Alternatively, if a source module was modified, and all of the remaining source modules were already compiled utilizing the profile data, then only that modified source code module need be recompiled in this optimization phase. In either event, source code modules are compiled individually by compiler 16 wherein optimization mechanism 19 identifies the corresponding MCA for the source code module being compiled (step 74). The optimization mechanism 19 then determines if there are procedures left to process (step 76). If no, the process is done (step 88). If yes, mechanism 19 processes the next procedure (step 78) as follows. First, it attempts to determine if the procedure has a valid corresponding PCA (step 80). If the answer is no, no profile information is used for the optimization of that procedure (i.e., it is optimized without profile data) (step 86). In this case, the process returns to step 76 to determine if any procedures remain for processing.

If it is determined that the procedure has a valid PCA, counter information is read from the PCA and the control flow graph being built by the compiler 16 is appropriately annotated (step 82). The procedure is then optimized, using the profile data annotated on the procedure's CFG to guide optimization (step 84). Once complete, any remaining procedures are then processed in a similar fashion.

Determining whether or not a procedure has a valid PCA may be accomplished by comparing a "signature" of the procedure with information in the PCA. For example, the optimization mechanism 19 can compare the number of counters in the PCA with the appropriate number of counters required in the procedure being processed. The optimization mechanism 19 could also compare a check sum in the PCA with a calculated check sum for the procedure.

Further, the optimizer may determine that the profile data is "valid" in the broader sense; that is, portions of the program are sufficiently unchanged that the original profile data may be applied to those portions, and static estimates may be applied to the remaining portions.

Figure 12:
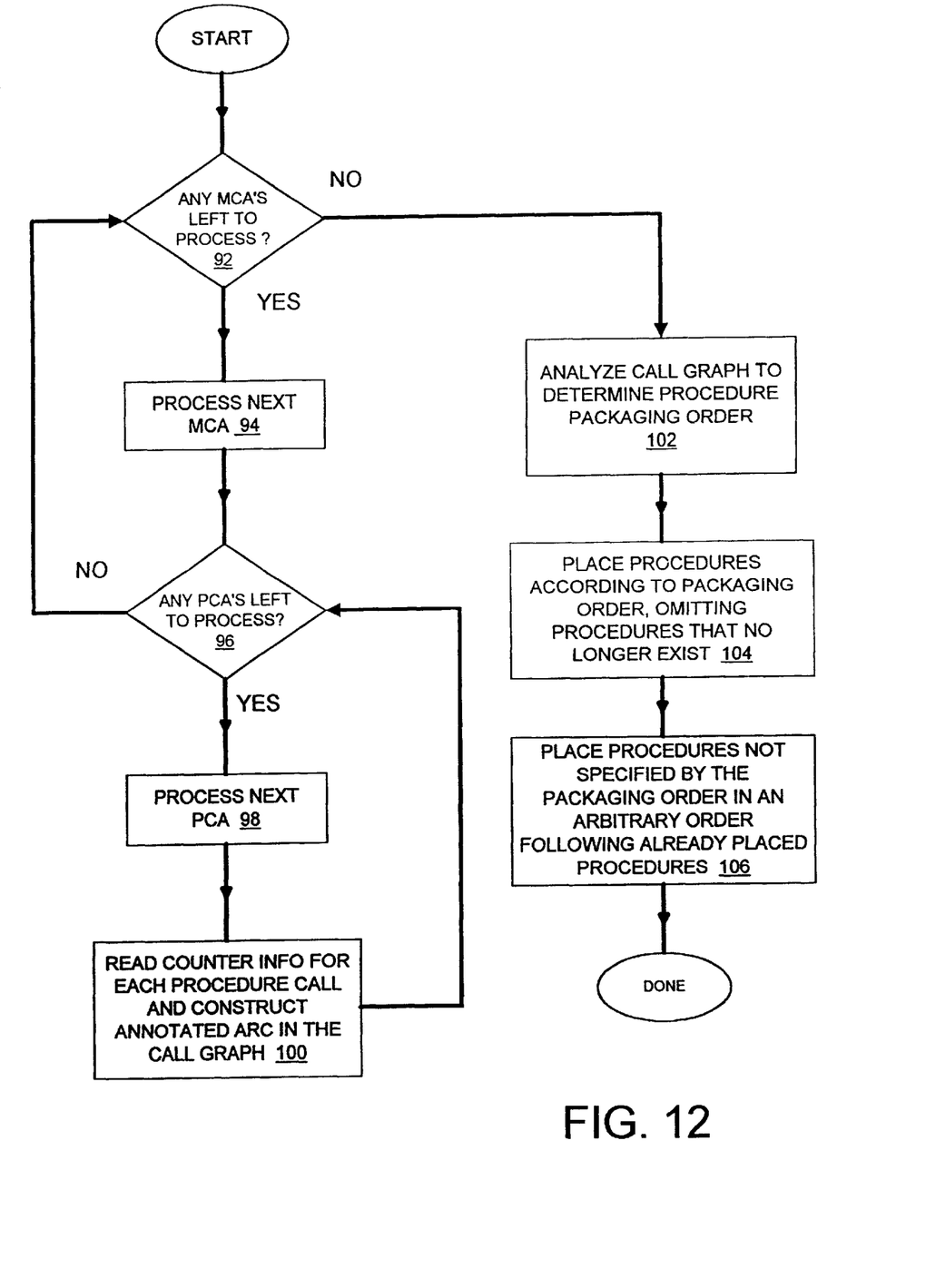
FIG. 12 depicts a flow diagram of an optimization phase within a linking mechanism in accordance with a preferred embodiment of the present invention.

An additional aspect of this invention is the ability to produce an optimized procedure packaging order even in the presence of significant source code changes, such as the addition or deletion of procedures, without requiring reprofiling. Known in the art are existing methods that analyze a weighted call graph of an object module or executable module and rearrange the procedures in that module to improve spatial locality, thus making more efficient use of memory paging systems. Such methods could be implemented with linking mechanism 18, or within compiler 16, or within some other stand-alone tool. FIG. 12 depicts a flow diagram showing this method in accordance with the present invention.

The first step is to gather counter information for procedure calls and use it to construct a call graph. For each source module used to build the object module or executable module being optimized, the optimization mechanism locates the source module's MCA (steps 92 and 94) and reads the counter information from each PCA within the MCA (steps 96, 98, 100). Each procedure call counter contributes its weight to an arc from the calling procedure to the called procedure. If there are multiple calls to one procedure within a different procedure, the corresponding weights are added. The result is a fully annotated call graph (step 100). Once the call graph has been fully constructed, a procedure packaging order is constructed, using one of the methods known today or developed in the future (step 102).

The next step is to place the procedures in the output object module or executable module according to the packaging order (step 104). However, if any source modules have changed since the profile data was gathered, it is possible that procedures have been added or deleted. Any procedures that exist in the call graph but have since been deleted from the module will be omitted from the new packaging order. Any procedures that have been added (and do not exist in the call graph) are added to the packaging order (step 106). In a preferred embodiment, all such procedures are placed in an arbitrary order after all procedures that did appear in the packaging order. It is understood however that any other ordering of added procedures could likewise be used within the scope of this invention.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. An apparatus comprising:
    a processing unit;
    a memory system, said memory system being connected to said processing unit; and
    a compiler program stored in said memory system for execution on said processing unit, said compiler program including:
        a code generator that converts a first instruction module having at least one procedure into a second instruction module;
        an instrumentation mechanism that inserts instrmentation code into said second instruction module and initializes a data object that includes a procedure counter area for each at least one procedure in said first instruction module; and
        an optimization mechanism that optimizes said second instruction module wherein said optimization mechanism includes a checking mechanism that determines if each at least one procedure has a corresponding and valid procedure counter area, and a reading mechanism that reads count information for each at least one procedure from said corresponding and valid procedure counter area.

2. The apparatus of claim 1 wherein said data object further includes a module counter area wherein said module counter area has a one-to-one correspondence with said first instruction module.

3. The apparatus of claim 2 wherein said optimization mechanism further includes a mechanism that constructs a call graph from count information stored in said procedure counter areas, a mechanism that analyzes said call graph to determine a procedure packaging order, a mechanism that places procedures according to the packaging order and omits procedures that no longer exist, and a mechanism that places procedures not specified by the packaging order among the already placed procedures.

4. The apparatus of claim 3 wherein said mechanism that places procedures not specified by the packaging order places them in an arbitrary order following already placed procedures.

5. The apparatus of claim 1 wherein said count information includes data gathered from a benchmark execution of a computer program that includes code built from said first instruction module.

6. The apparatus of claim 1 wherein said checking mechanism determines validity of each said at least one procedure counter area by comparing a signature of each procedure with information stored in each corresponding procedure counter area.

7. The apparatus of claim 1 wherein said checking mechanism determines validity of each of said at least one procedure counter area by comparing a signature of each procedure with information stored in each corresponding procedure counter area, wherein said signature of each procedure includes a total number of counters in said procedure.

8. The apparatus of claim 1 wherein said checking mechanism determines validity of each of said at least one procedure counter area by comparing a signature of each procedure with information stored in each corresponding procedure counter area, wherein said signature of each procedure includes at least one functional value computed from attributes of said procedure.

9. A program product comprising:
   a recordable media; and
   a compiler recorded on said recordable media accessible by a computer system for execution on a central processing unit, said compiler having:
   a first processing mechanism that translates at least one source code module into an output module, inserts instrumentation code into said output module, and initializes a procedure specific storage area for each procedure in said at least one source code module, wherein each said procedure specific storage area provides space for holding procedure specific profile information generated during execution of said output module; and
   a second processing mechanism that translates said at least one source code module into an optimized output module, said second processing mechanism including a mechanism that examines each procedure in said at least one source code module, determines if procedure specific profile information exists for each procedure, determines if said existing procedure specific profile information is valid, and utilizes said valid procedure specific profile information to optimize said optimized output module.

10. The program product of claim 9 wherein said first processing mechanism also initializes a module specific storage area for each at least one source code module processed by said first processing mechanism, wherein each said module specific storage area holds said procedure specific storage areas associated with said source code module.

11. The program product of claim 10 further comprising a harvesting mechanism that converts the procedure specific profile information generated during execution of said output module into a plurality of profile files readable by said second processing mechanism such that each profile file corresponds to a unique source code module.

12. The program product of claim 11 wherein each of said plurality of profile files contains procedure specific profile information of the procedures in the source code module corresponding to the profile file.

13. The program product of claim 10 wherein said second processing mechanism further includes a mechanism that constructs a call graph from said procedure specific profile information stored in said procedure specific storage areas, a mechanism that analyzes said call graph to determine a procedure packaging order, a mechanism that places procedures according to the packaging order and omits procedures that no longer exist, and a mechanism that places procedures not specified by the packaging order among the already placed procedures.

14. The program product of claim 13 wherein said mechanism that places procedures not specified by the packaging order places them in an arbitrary order following already placed procedures.

15. The program product of claim 9 wherein said procedure specific profile information includes count data.

16. A program product comprising:
   a recordable media; and
   an optimizing program recorded on said recordable media that optimizes program modules using profile data, wherein said optimizing program includes:
   a mechanism that processes procedures within each program module;
   a mechanism that determines if a unique set of procedure specific profile data exists for each procedure processed;
   a mechanism that determines if existing procedure specific profile data is valid; and
   a mechanism for reading and applying valid procedure specific profile data.

17. The program product of claim 16 further comprising a mechanism that identifies a profile file that corresponds to the program module being optimized wherein said profile file contains said procedure specific data for the program module being optimized.

18. The program product of claim 16 wherein said mechanism that determines if procedure specific profile data is valid examines the number of counters and compares the number with information from the related procedure.

19. The program product of claim 16 wherein said mechanism that determines if procedure specific profile data is valid examines at least one functional value computed from attributes of the related procedure.

20. The program product of claim 16 wherein said optimizing program further includes a mechanism that constructs a call graph from said procedure specific profile data, a mechanism that analyzes said call graph to determine a procedure packaging order, a mechanism that places procedures according to the packaging order and omits procedures that no longer exist, and a mechanism that places procedures not specified by the packaging order among the already placed procedures.

21. The program product of claim 20 wherein said mechanism that places procedures not specified by the packaging order places them in an arbitrary order following the already placed procedures.

22. A method of managing profile data for a computer program that is built with a compiler from a plurality of source code modules wherein said method does not require the reprofiling of the entire computer program when a small portion of the source code is modified, said method comprising the steps of:
   creating an instrumented executable program by initially compiling and linking the plurality of source code modules using the steps of:
     initializing a module counter area for each source code module being compiled;
     inserting instrumentation code into procedures as needed during the compilation of each source code module; and
     for each procedure receiving instrumentation code, initializing a procedure counter area that is contained within the module counter area of the source code module being compiled;
   benchmarking said instrumented executable program to generate profile data that is stored in said procedure counter areas within said module counter areas; and
   creating an optimized executable program by compiling and linking said plurality of source code modules using the steps of:

for each source code module being compiled, identifying the source code module's corresponding module counter area;

for each procedure within the source code module being compiled, attempting to identify the procedure's corresponding procedure counter area;

for each procedure counter area identified, determining if the procedure counter area is valid; and reading profile count data from the procedure counter area for optimizing purposes.

23. The method of claim 22 comprising the further step of ignoring profile data from an invalid procedure counter area.

24. The method of claim 22 wherein said step of creating an optimized executable program further includes the steps of:

reading the profile call data within the procedure counter area for each procedure call within the source code file being compiled;

building a call graph from said profile call data;

analyzing said call graph to determine a packaging order;

placing procedures according to said packaging order such that procedures that no longer exist are omitted; and placing procedures not specified by the packaging order among the already placed procedures.

25. A method of building and maintaining an optimized computer program using existing profile information wherein profile information is stored in unique procedure counter area for each procedure within each source code module, said method comprising the steps of:

compiling at least one source code module with said existing profile information, said compiling step including the steps of:

for each procedure within the at least one source code module, determining if a procedure counter area exists;

for each existing procedure counter area, determining if the existing procedure counter area is valid; and for each valid procedure counter area, reading said profile information stored therein and optimizing accordingly.

26. The method of claim 25 further comprising the compiling steps of:

for each procedure in said at least one source code module, identifying each procedure call and reading its corresponding counter from the procedure counter area; and optimizing accordingly.

27. The method of claim 25 further comprising the compiling steps of:

building a control flow graph for each procedure in said source code module; and determining validity of each procedure counter area by comparing a signature of the control flow graph with information in said procedure counter area.

28. The method of claim 25 further comprising the compiling steps of:

building a call graph from said profile information;

analyzing said call graph to determine a packaging order;

placing procedures according to said packaging order such that procedures that no longer exist are omitted; and placing procedures not specified by the packaging order among the already placed procedures.

29. A method of creating and using profile data for a computer program that is built from at least one source code module having at least one procedure, said method comprising the steps of:

creating an instrumented executable program that includes a process for generating procedure specific profile data from said at least one source code module;

benchmarking said instrumented executable program and storing profile information in procedure specific data areas; and optimizing said at least one source code module such that procedures that have not been modified since the benchmarking step will be processed using said procedure specific profile data and procedures that have been modified since the benchmarking step will be processed without procedure specific profile data.

* * * * *

UNITED STATES PATENT AND TRADEMARK OFFICE
CERTIFICATE OF CORRECTION

PATENT NO.    : 6,631,518 B1                                              Page 1 of 1
DATED         : October 7, 2002
INVENTOR(S)   : Vita Bortnikov et al.

It is certified that error appears in the above-identified patent and that said Letters Patent is hereby corrected as shown below:

<u>Title page,</u>
Item [74], *Attorney, Agent, or Firm*, "Schmeiser, Olsen & Watts; Steven W. Roth" should be -- Schmeiser, Olsen & Watts; Steven W. Roth; Wood, Herron and Evans LLP --.

Signed and Sealed this

Twenty-seventh Day of January, 2004

JON W. DUDAS
*Acting Director of the United States Patent and Trademark Office*